United States Patent [19]
Imamura et al.

[11] Patent Number: 5,999,751
[45] Date of Patent: Dec. 7, 1999

[54] FLASH DEVICE AND REFLECTOR FOR FLASH DISCHARGE TUBE

[75] Inventors: Takashi Imamura; Manabu Tobise, both of Kanagawa, Japan

[73] Assignee: Fuji Photo Film Co., Ltd., Kanagawa, Japan

[21] Appl. No.: 09/195,545

[22] Filed: Nov. 19, 1998

[30] Foreign Application Priority Data

Dec. 3, 1997 [JP] Japan ..................................... 9-332964
Dec. 5, 1997 [JP] Japan ..................................... 9-335434
Dec. 17, 1997 [JP] Japan ..................................... 9-347438

[51] Int. Cl.$^6$ .................................................. G03B 15/03
[52] U.S. Cl. ......................................................... 396/200
[58] Field of Search ........................... 396/200, 6; 362/16

[56] References Cited

U.S. PATENT DOCUMENTS 5,884,104  3/1999  Chase et al. ..................... 396/200 X Primary Examiner—W. B. Perkey
Attorney, Agent, or Firm—Young & Thompson

[57] ABSTRACT

A flash device has a flash discharge tube for emitting flash light in response to occurrence of trigger current. A reflector has electrical conductivity, transmits the trigger current to flash discharge tube, and reflects the flash light toward a photographic field in a predetermined illuminating pattern. The reflector includes a peripheral reflective portion and lateral portions. The peripheral reflective portion is curved to cover a rear, a top and a bottom of the flash discharge tube. The lateral portions are disposed on ends of the peripheral reflective portion in a longitudinal direction of the flash device. A trigger segment transmits the trigger current to the reflector. The trigger segment is disposed to push an outer face of the lateral portions for electrical connection with the reflector, to stabilize orientation of the reflector for avoiding changes in the predetermined illuminating pattern.

17 Claims, 14 Drawing Sheets

F I G. 8
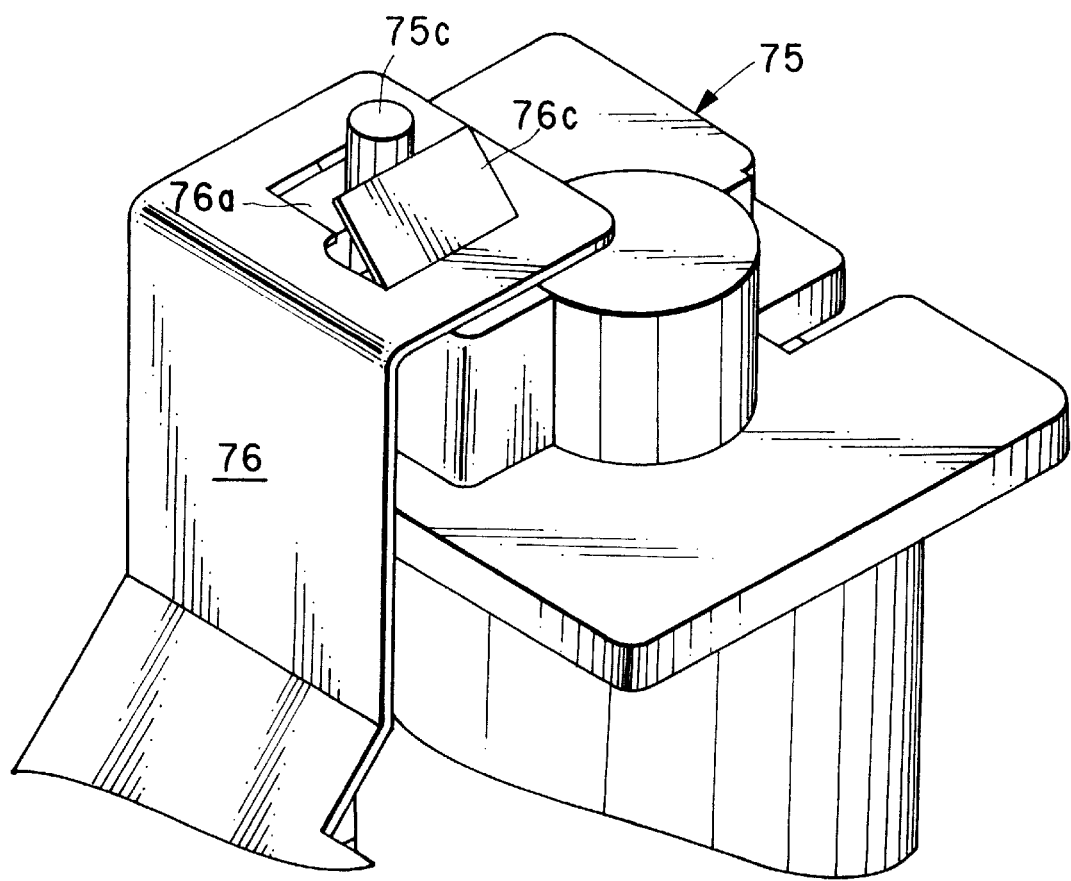

F I G. 10
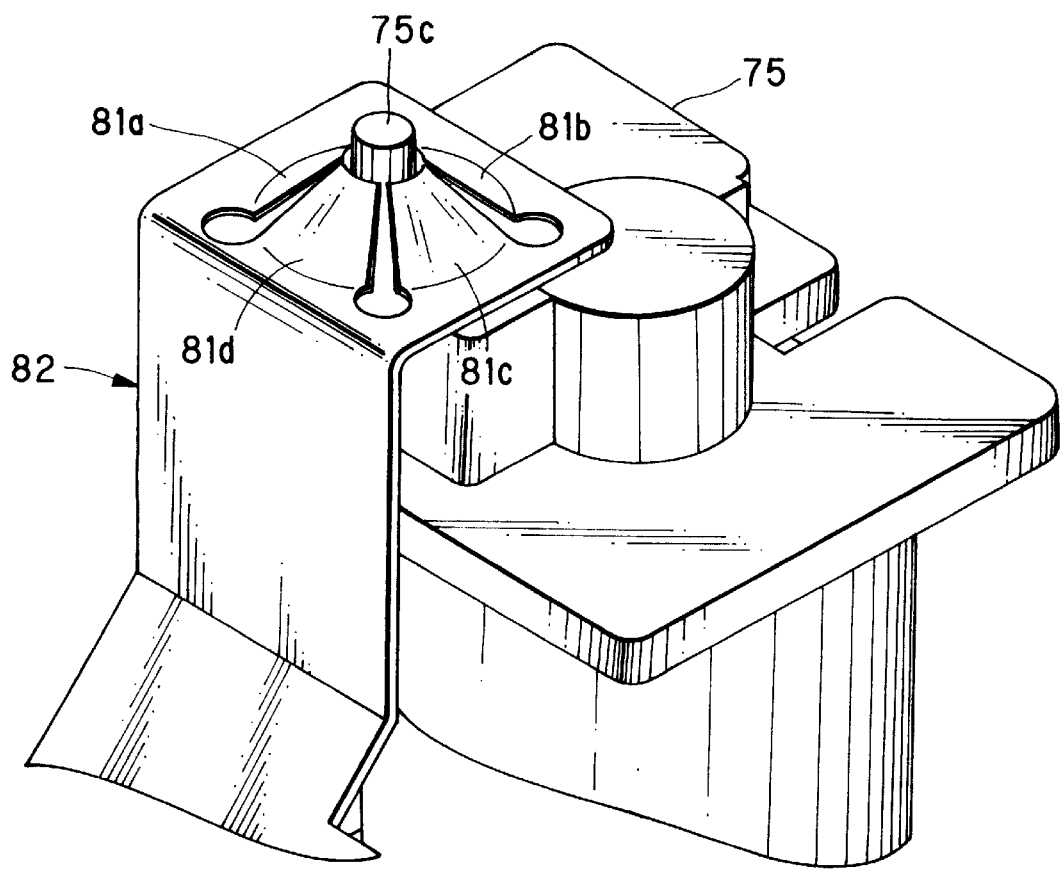

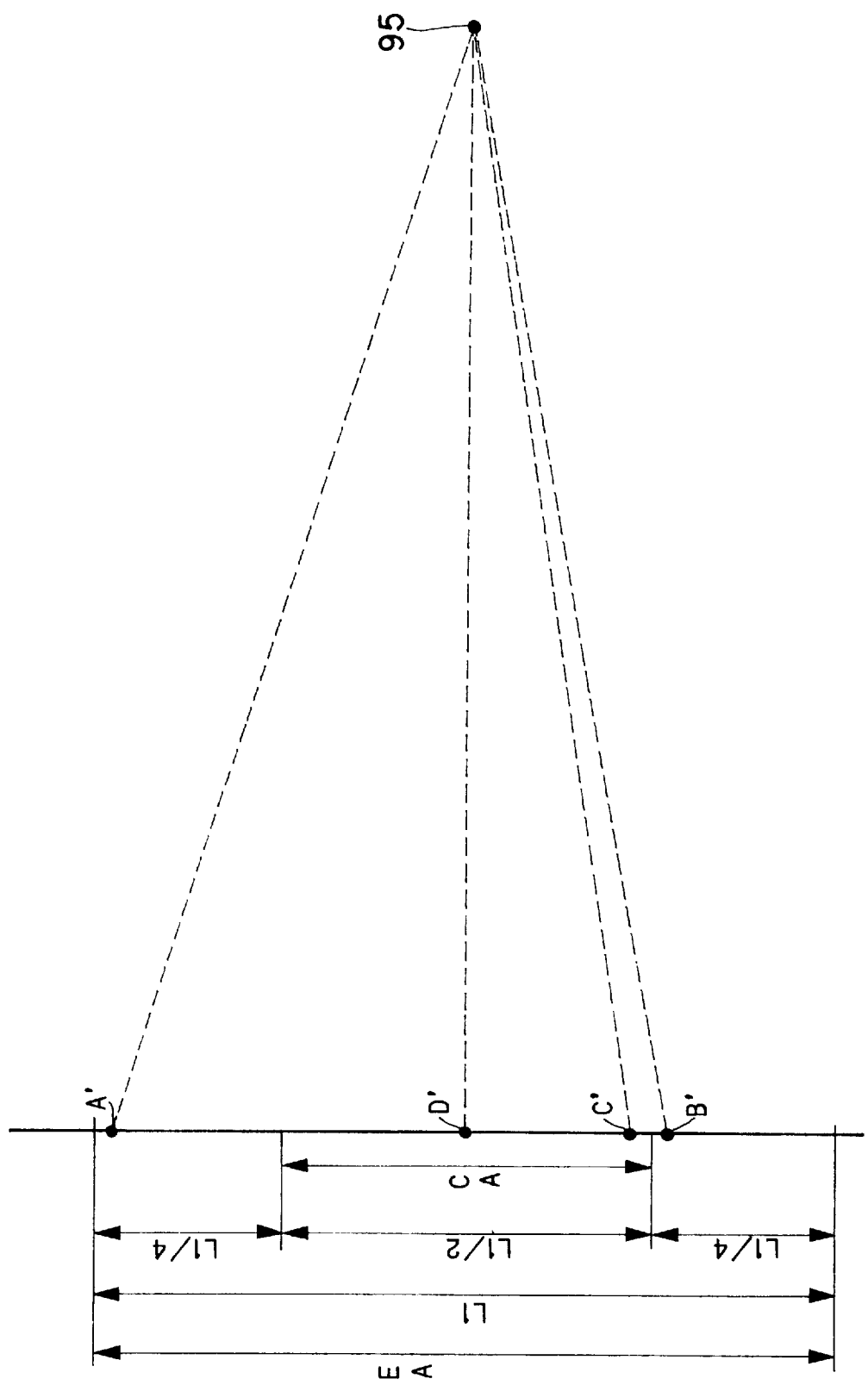

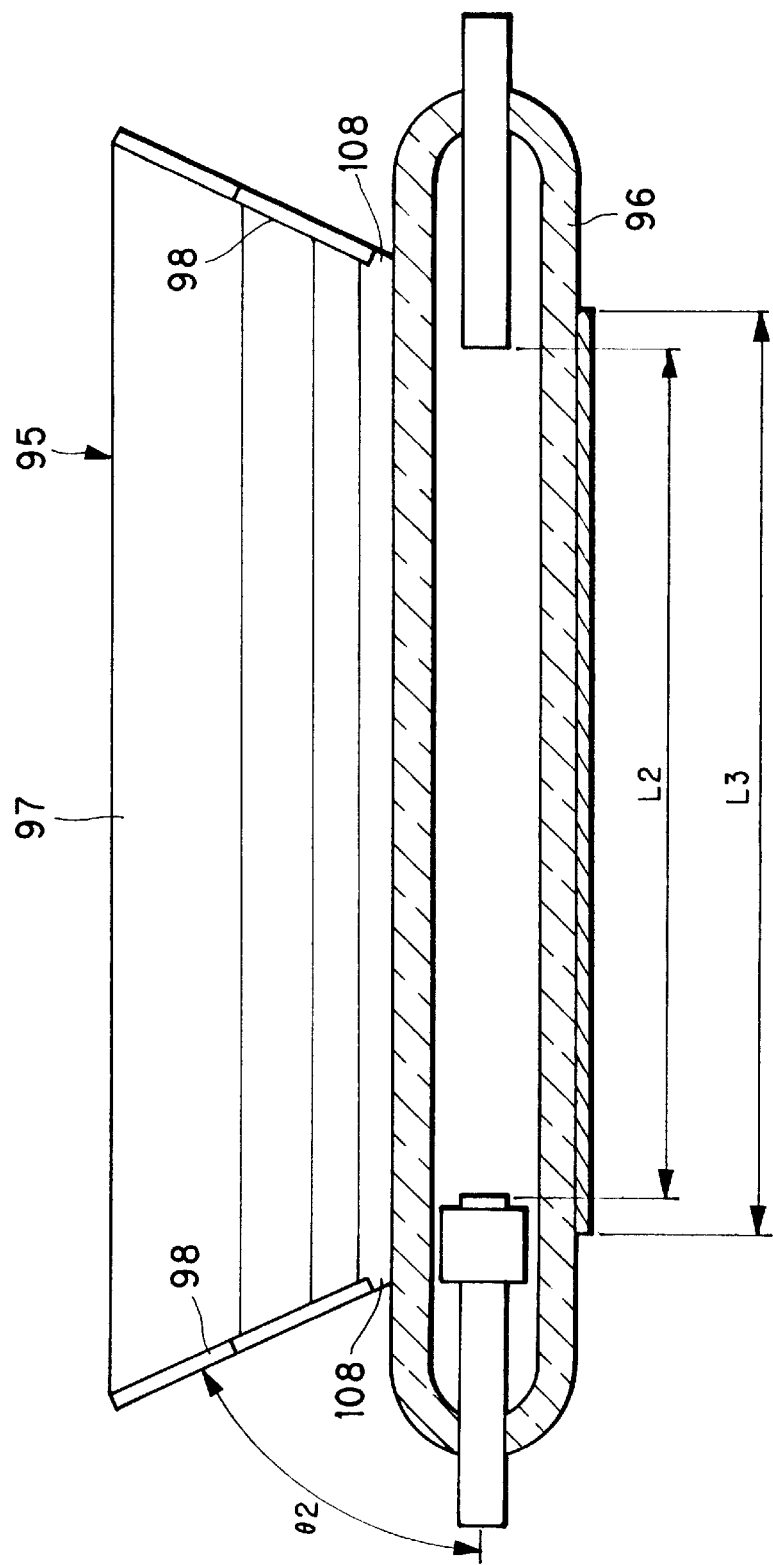

FLASH DEVICE AND REFLECTOR FOR FLASH DISCHARGE TUBE

BACKGROUND OF THE INVENTION

1. Field of the Invention

The present invention relates to a flash device and a reflector for a flash discharge tube. More particularly, the present invention relates to a flash device and a reflector for a flash discharge tube used in a lens-fitted photo film unit or a compact camera.

2. Description Related to the Prior Art

A lens-fitted photo film unit is commercially available and widely used, which has a housing incorporating an exposure-taking mechanism of a simple structure, and is preloaded with unexposed photo film. There are various types of lens-fitted photo film units, one of which incorporates an electronic flash device for the purpose of taking photographs indoors or at night. The flash device to be built in the lens-fitted photo film unit has a simple structure to decrease the cost of the lens-fitted photo film unit, and consists of a flash unit in which a printed circuit board is used to mount electrical parts constituting a flash emitter of a flash circuit.

The flash emitter is structurally constituted by a flash discharge tube, a reflector, a diffuser plate and a reflector case. The flash discharge tube emits flash light upon discharging operation of electric charge stored in a main capacitor. The reflector is curved for reflecting the flash light emitted by the flash discharge tube toward the front in a predetermined illuminating pattern. The reflector case contains and supports those elements. As is well-known in the art, the flash discharge tube consists of a flash tube body of glass enclosing xenon (Xe) gas. For flash emission of the flash discharge tube, the main capacitor has been charged to apply predetermined voltage to terminals of the flash discharge tube. Trigger voltage, for example as high as 4 kV, is generated by a trigger transformer, and applied to the outer surface of the flash tube body for trigger current to flow to it, so that the xenon gas is ionized.

To supply the flash discharge tube with trigger current, it is known to wind an electrically conductive wire directly on the flash tube body to apply the trigger voltage to the flash tube body through the wire. Or the flash tube body is kept in contact with the inside of the reflector electrically conductive. The trigger voltage is applied to the reflector and then to the flash tube body for triggering the flash emitting operation.

To apply the trigger voltage to the reflector, a lead line is connected between a trigger output terminal of the trigger transformer and the reflector. Or a trigger segment of metal is used to contact the reflector for application of the trigger voltage from the trigger transformer. The use of the lead line is less advantageous, because parts of the flash device cannot be very easily assembled in an automated manner. Thus the trigger segment is more widely used.

It is general in the flash device that the trigger segment for transmitting the trigger current has an end soldered on to the trigger output terminal of a secondary winding of the trigger transformer.

In most of widely used flash devices, the reflector, as viewed in a cross section, has a shape of an elliptical arc as a curved reflective surface, to regulate illumination adequately. Also there are known reflective surfaces defined by a hyperbolic curve, a parabolic curve or other suitable functional curves.

When the trigger segment is used as described above, the trigger segment is caused to push the reflector with sufficient pressure for ensure application of trigger voltage to the reflector. However the pressure of the trigger segment is likely to deform the reflector in such a manner that an illuminating pattern of the flash light at a distance of several meters becomes different from an illuminating pattern initially expected for the flash device. Such an unexpected illuminating pattern of flash light causes an irregularity in exposure of a photograph taken with the flash light.

The above-described soldering process of the metal plate or lead line to the trigger output terminal of the secondary winding of the trigger transformer is much complicated and requires long time of assembly. It is difficult to decrease the manufacturing cost or to increase the productivity of the flash device. Also in view of administration of the manufacture, the soldering process must be inspected in a periodical manner. Soldering itself has a problem of much use of electric power and much metal as solder.

The reflector having the above-described curved reflective surface defined by the elliptical arc has a difficulty in controlling rays incident on an illuminating region. It is impossible to increase light condensing efficiency considerably, which is defined as a ratio of an amount of rays incident on a photographic field to a total amount of rays emitted by the flash discharge tube. In the type of the reflector defined by the functional curves, the light condensing efficiency would be increased by use of a protector operating as a Fresnel lens, which is transparent and covers the front of the reflector. However this construction requires a considerable back-to-front space of the flash emitter, to enlarge the size of the flash device. Also the protector as a Fresnel lens requires a complicated process to be molded, and increases its manufacturing cost.

SUMMARY OF THE INVENTION

In view of the foregoing problems, an object of the present invention is to provide a flash device in which an illuminating pattern of flash light is prevented from changing even with pressure of a trigger segment to a reflector for electrical connection to apply trigger voltage to a flash discharge tube.

Another object of the present invention is to provide a flash device of which a process of assembly of a trigger segment is simplified to reduce time required for the assembly.

Still another object of the present invention is to provide a reflector for a flash discharge tube in which a light condensing efficiency is increased even with a simple structure.

In order to achieve the above and other objects and advantages of this invention, a flash device has a flash discharge tube for emitting flash light in response to occurrence of trigger current. A reflector has electrical conductivity, transmits the trigger current to flash discharge tube, and reflects the flash light toward a photographic field in a predetermined illuminating pattern. The reflector includes a peripheral reflective portion and lateral portions, the peripheral reflective portion being curved to cover a rear, a top and a bottom of the flash discharge tube, the lateral portions being disposed on ends of the peripheral reflective portion in a longitudinal direction of the flash device. A trigger segment transmits the trigger current to the reflector. The trigger segment is disposed to push an outer face of the lateral portions for electrical connection with the reflector, so as to stabilize orientation of the reflector for avoiding changes in the predetermined illuminating pattern.

To be precise, a trigger transformer outputs the trigger current. The trigger segment has a first end connected with the trigger transformer, and a second end connected with the reflector.

In another preferred embodiment, the trigger segment is disposed to push a ridge portion of an outer face of the reflector for electrical connection with the reflector, so as to stabilize orientation of the reflector for avoiding changes in the predetermined illuminating pattern.

In still another preferred embodiment, a flash device includes a flash discharge tube, having gas enclosed therein, for emitting flash light in response to occurrence of trigger current. A trigger transformer generates the trigger current. A trigger segment transmits the trigger current to the flash discharge tube. A bend plate is formed integrally with an end of the trigger segment, bent in a direction of insertion of a trigger output terminal of the trigger transformer, for resiliently keeping the trigger segment pushed on the trigger output terminal.

In a further preferred embodiment, a tube receiver portion is disposed in the reflector, for receiving the flash discharge tube fitted thereon. A first curved reflective surface is formed on the reflector to extend from the tube receiver portion, and has a shape of an arc as viewed in cross section. A second curved reflective surface is formed on the reflector to extend from the first curved reflective surface, and has a shape of an elliptical arc as viewed in cross section. A flat reflective surface is formed on the reflector to extend from the second curved reflective surface, and has a shape of a straight line as viewed in cross section.

BRIEF DESCRIPTION OF THE DRAWINGS

The above objects and advantages of the present invention will become more apparent from the following detailed description when read in connection with the accompanying drawings, in which:

FIG. 8 is a perspective in enlargement illustrating contacted portions of the trigger transformer and the trigger segment;

FIG. 10 is a perspective illustrating other preferred bend plates in combination;

FIG. 13 is an explanatory view illustrating an illuminating state of the reflector; and FIG. 14 is a horizontal section illustrating the reflector and the flash discharge tube.

DETAILED DESCRIPTION OF THE PREFERRED EMBODIMENTS OF THE PRESENT INVENTION

Figure 1:
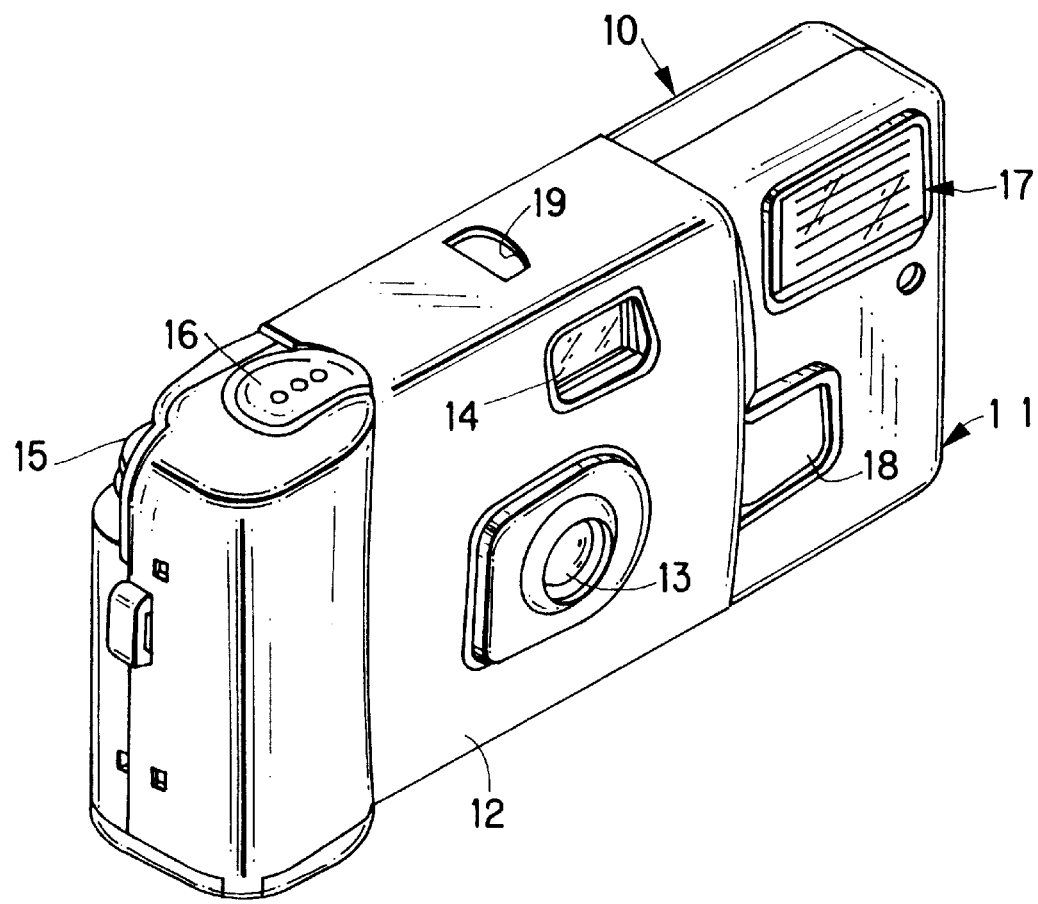
FIG. 1 is a perspective illustrating a lens-fitted photo film unit.

In FIG. 1, a lens-fitted photo film unit 10 is illustrated. The lens-fitted photo film unit 10 is constituted by a housing 11 and a belt-shaped label 12 or sticker. The lens-fitted photo film unit 10 incorporates a simple mechanism for taking an exposure and is pre-loaded with unexposed photo film. The label 12 covers a portion of the housing 11. The label 12 has recesses or openings which uncover a taking lens 13, a viewfinder 14, a winder wheel 15, a shutter release button 16, a flash emitter 17 and the like. A reference numeral 19 designates a counter wheel.

A charger pushbutton 18 is disposed in the front of the housing 11 and under the flash emitter 17. When the charger pushbutton 18 is depressed, a main capacitor 30 depicted in FIG. 2 is charged.

Figure 2:
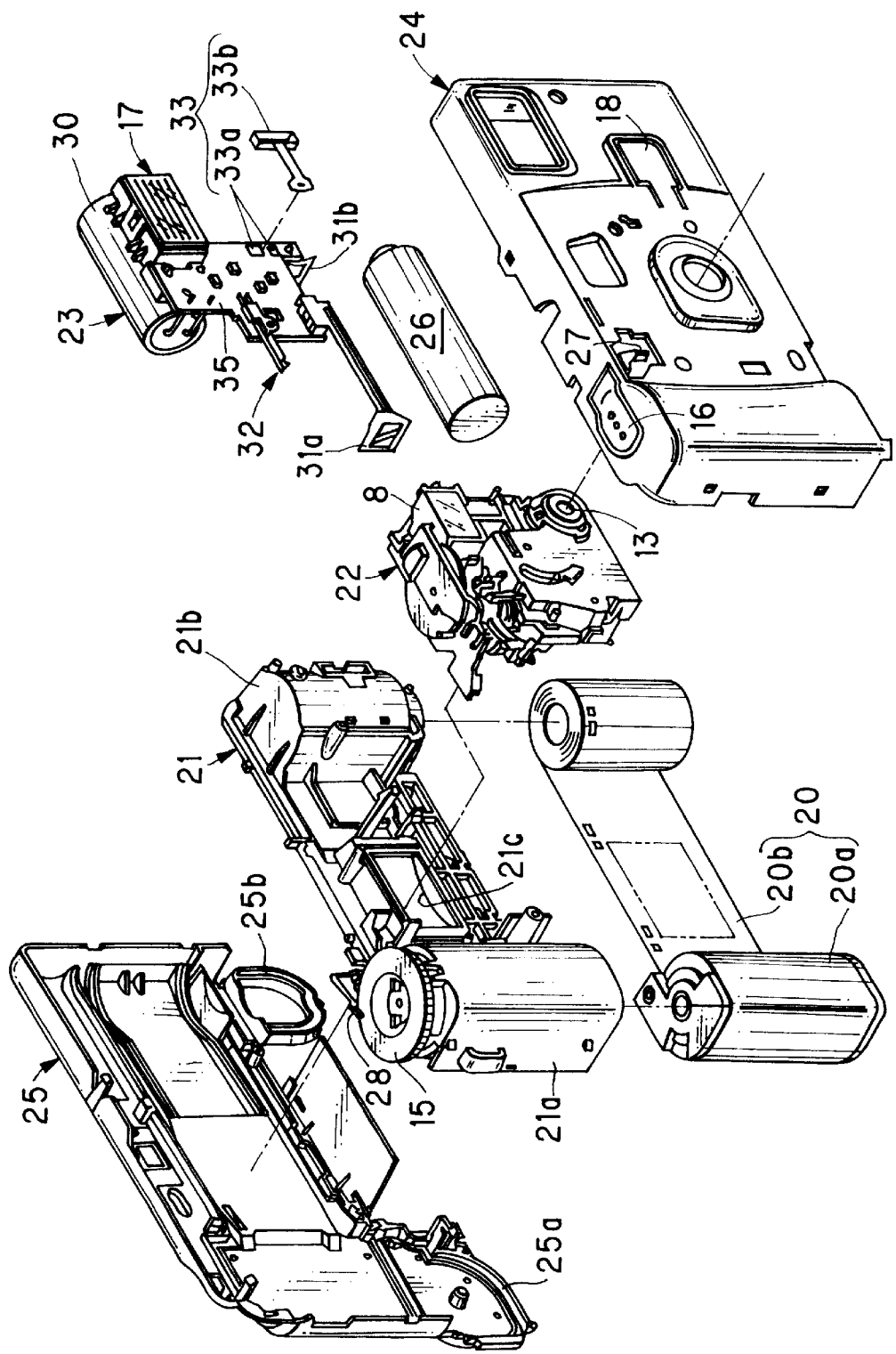
FIG. 2 is an exploded perspective illustrating the lens-fitted photo film unit.

In FIG. 2, a structure of the housing 11 is illustrated. The housing 11 is constituted by a main body 21, an exposure unit 22, an electronic flash device 23, a front cover 24, a rear cover 25 and a dry battery 26. The main body 21 is pre-loaded with a cassette shell 20a of a photo film cassette 20, and a roll of photo film 20b drawn from the photo film cassette 20 and wound again externally. The exposure unit 22 and the flash device 23 are mounted on the front of the main body 21. The front cover 24 is mounted on the front of the main body 21 and covers the exposure unit 22 and the flash device 23. The rear cover 25 is mounted behind the main body 21 and keeps the photo film 20b contained with the main body 21 in a light-tight manner. The battery 26 is a power source of the flash device 23.

The exposure unit 22 is a component incorporating a counter mechanism, a shutter mechanism, a one-frame advance mechanism, the taking lens 13, the viewfirder 14 and the like. The counter mechanism indicates the number of remaining available frames. The one-frame advance mechanism operate to advance the photo film frame by frame. A push rod 27 is disposed on the bottom of the shutter release button 16, and operates to push a part included in the exposure unit 22 to actuate the shutter mechanism.

The main body 21 has a cassette holder chamber 21a and a photo film holder chamber 21b. The cassette holder chamber 21a contains the cassette shell 20a. The photo film holder chamber 21b contains the roll of the photo film 20b. Bottoms of the cassette holder chamber 21a and the photo film holder chamber 21b are open, and closed by bottom lids 25a and 25b, which are formed integrally with the rear cover 25. The bottom lid 25a of the cassette holder chamber 21a is closed by engagement of hooks in an openable manner. The bottom lid 25a will be opened for removing the cassette shell 20a after the containing the photo film 20b being exposed.

The winder wheel 15 is disposed on the top of the cassette holder chamber 21a in a rotatable manner. When the winder wheel 15 is rotated in the counterclockwise direction in the drawing, an exposed portion of the photo film 20b is wound into the cassette shell 20a. An unexposed portion of the photo film 20b is simultaneously drawn out of the photo film holder chamber 21b and set on the rear of an exposure aperture 21c. An anti-return claw 28 is formed on the top of the rear of the main body 21.

The shutter release button 16 is formed with the top of the front cover 24. Openings are formed in the front portion of the front cover 24 to uncover the taking lens 13, the viewfinder 14 and the flash emitter 17. Also the charger pushbutton 18 is formed with the front cover 24.

The flash device 23 consists of a printed circuit board 35 and various components assembled on the printed circuit board 35, the components including the flash emitter 17, the main capacitor 30, a number of electrical parts, the battery 26, a pair of pole plates 31a and 31b, a synchro switch 32, a charger switch 33. The pole plates 31a and 31b support the battery 26 for connection to the flash circuit.

The synchro switch 32 consists of two horizontal metal segments arranged vertically at a predetermined interval. When a shutter blade of the shutter mechanism is fully opened, the upper one of the segments is pushed down to contact the lower one of them, to turn on the synchro switch 32. The charger switch 33 is constituted by a metal segment 33b and a pair of contact points 33a, which are arranged on the printed circuit board 35. When the charger pushbutton 18 is depressed, the metal segment 33b contacts both the contact points 33a to connect the contact points 33a with each other, so that the charger switch 33 is turned on.

Figure 3:
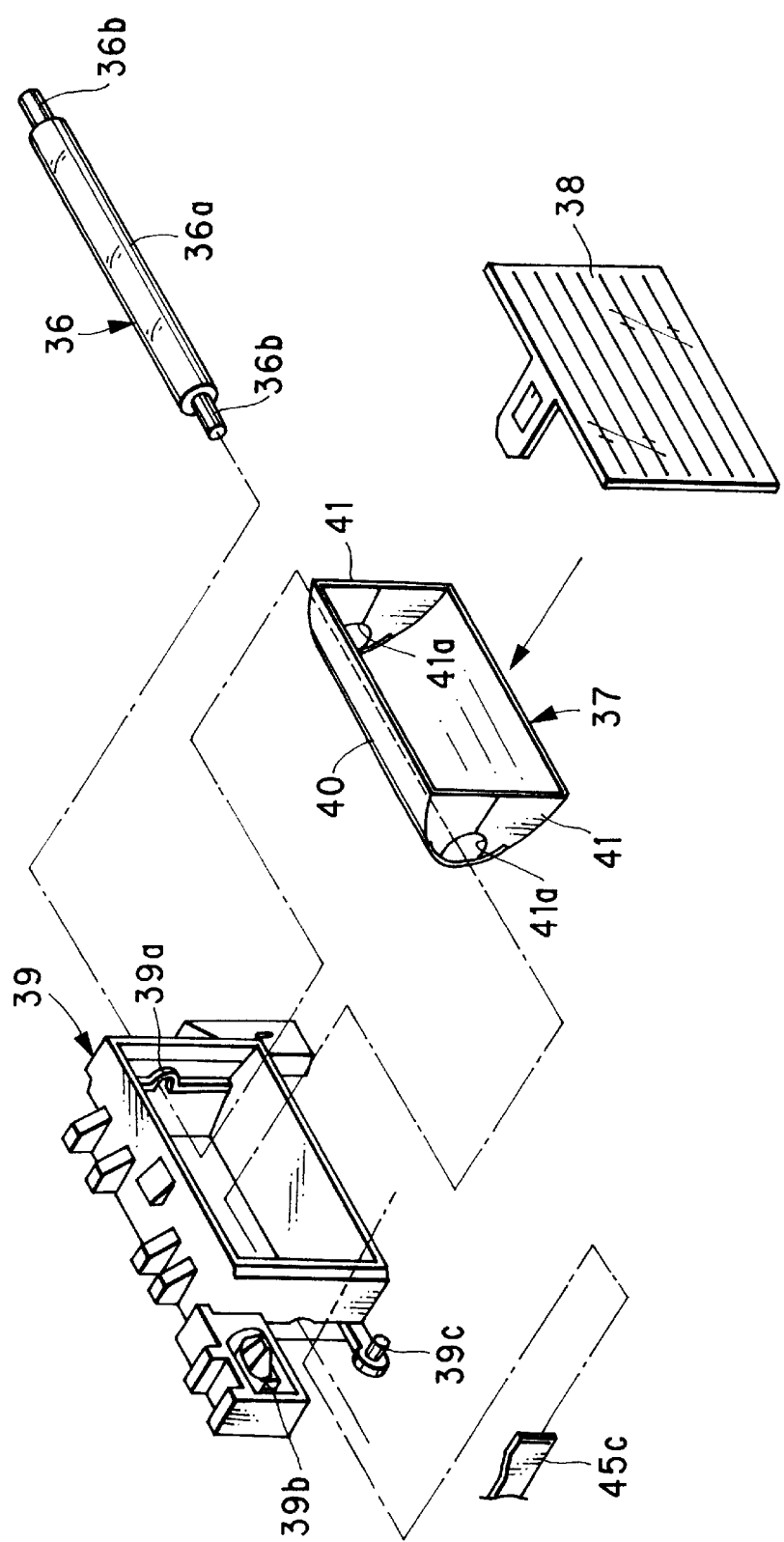
FIG. 3 is an exploded perspective illustrating a flash emitter of a flash device.

In FIG. 3, the flash emitter 17 is constituted by a flash discharge tube 36, a reflector 37, a diffuser plate 38 and a reflector case 39. The flash discharge tube 36 has a flash tube body 36a known in the art and having a cylindrical shape in which xenon (Xe) gas is enclosed. When predetermined voltage is applied between terminals 36b of the flash discharge tube 36 by the main capacitor 30 being charged, trigger voltage as high as 4 kV is applied to the outer surface of the flash tube body 36a, so that the xenon gas is ionized. The insulated state between the terminals 36b is interrupted. The charge stored in the main capacitor 30 is passed through the flash tube body 36a, to emit flash light by the discharge operation of the flash discharge tube 36.

The reflector 37 consists of a bent shape of a single thin plate of metal, such as aluminum, and is electrically conductive. The reflector 37 includes a peripheral reflective portion 40 and a pair of lateral portions 41. The peripheral reflective portion 40 is curved in a shape open in a direction of illumination of the flash light, and covers the rear, the top and the bottom of the flash tube body 36a. The inside of the peripheral reflective portion 40 reflects the flash light from the flash discharge tube 36 toward the housing 11. The curved shape of the peripheral reflective portion 40 is defined by a combination of various lines as viewed in cross section, such as arcs, elliptic arcs, straight lines, parabolic lines and the like, for the purpose of applying the flash light to a front field to be photographed according to a predetermined illuminating pattern or distribution in cooperation with the diffuser plate 38.

The lateral portions 41 close the ends of the curved shape of the peripheral reflective portion. 40 as viewed in the longitudinal direction of the flash tube body 36a. An inner face of the lateral portions 41 reflects the flash light from the flash tube body 36a. The lateral portions 41 operate in an auxiliary manner to regulate the illuminating pattern in the longitudinal direction of the flash discharge tube 36. There are cutouts 41a formed in the lateral portions 41 for the purpose of insertion of the flash tube body 36a.

The reflector case 39 is formed from plastic material, and includes a pair of end supports 39a, disposed to correspond to the cutouts 41a of the lateral portions 41, for supporting respective ends of the flash tube body 36a. One lateral end of the reflector case 39 has an engaging claw 39b and an engaging pin 39c, which secures the flash emitter 17 to the printed circuit board 35 in a fixed manner.

After the reflector 37 is inserted in the reflector case 39, the flash discharge tube 36 is inserted through the cutouts 41a in the reflector 37, and mounted to keep the surface of the flash tube body 36a in contact with the inside of the peripheral reflective portion 40. Thus the trigger voltage is applied to the flash tube body 36a via the reflector 37. The reflector 37 is also kept fixed on the reflector case 39 by assembly of the flash discharge tube 36.

The diffuser plate 38 is secured to the front of the reflector case 39 after assembly of the reflector 37 and the flash discharge tube 36. The diffuser plate 38 diffuses the flash light including rays emitted by the flash discharge tube 36 and rays reflected by the reflector 37.

Figure 4:
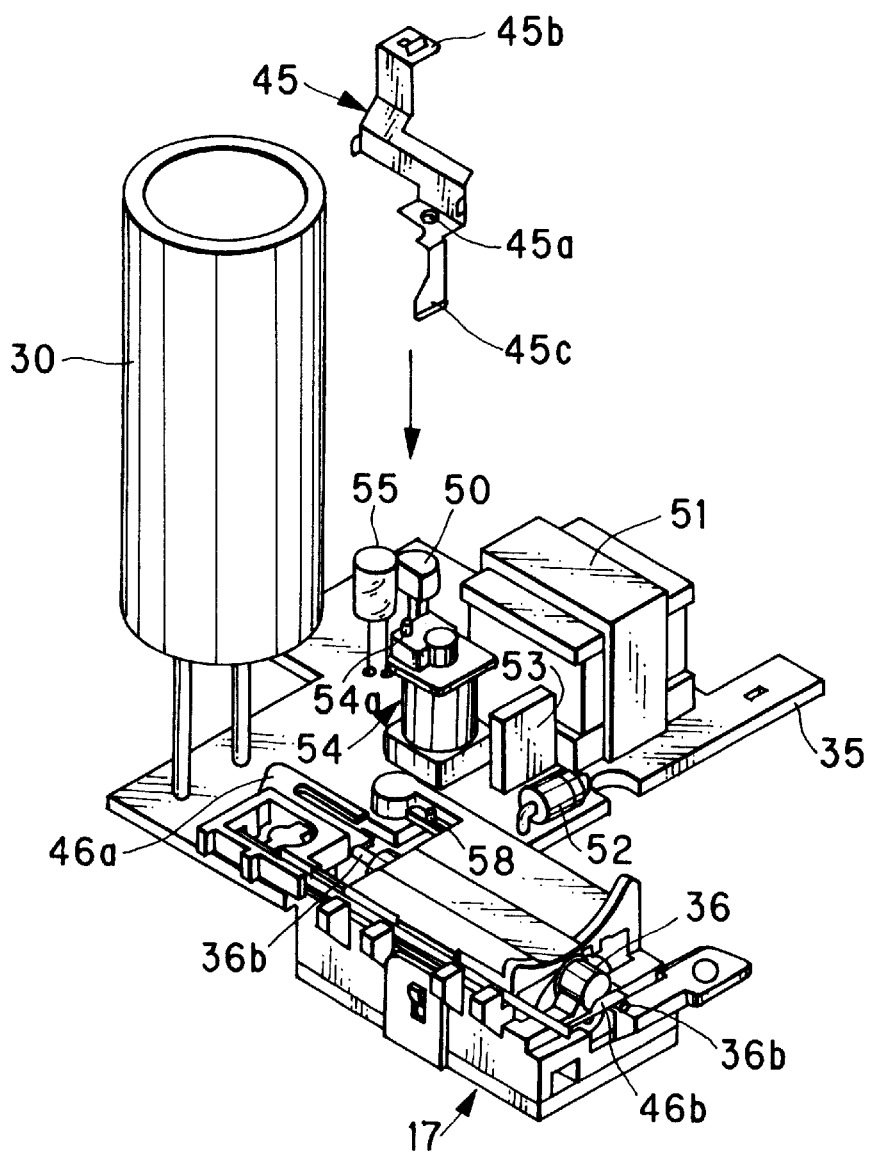
FIG. 4 is a perspective illustrating a rear of the flash device.

The rear of the flash device 23 is illustrated in FIG. 4. In FIG. 4, the main capacitor 30 is depicted in an erected manner, a trigger segment 45 is depicted in a separated manner, both for the purpose of convenience in understanding. The main capacitor 30 is disposed behind the flash emitter 17. The terminals 36b of the flash discharge tube 36 are connected by tube connector segments 46a and 46b with a circuit pattern on the printed circuit board 35 in connection with terminals of the main capacitor 30.

Behind the printed circuit board 35 are arranged the main capacitor 30, an oscillation transistor 50, an oscillation transformer 51, a rectifier diode 52, a trigger capacitor 53, a trigger transformer 54, a light-emitting diode (LED) 55 and the like. The oscillation transistor 50 and the oscillation transformer 51 constitute a blocking oscillator or a booster circuit. The LED 55 operates for indicating a finish of charging operation. Those parts have lead terminals which are passed in respective through holes formed in the printed circuit board 35, and are soldered on to lands arranged in front of the printed circuit board 35. Note that electrical parts of the chip type are directly soldered on to the circuit pattern on the front of the printed circuit board 35.

The trigger transformer 54 includes a winding component 54b, a trigger output terminal 54a and lower terminals 54c. The lower terminals 54c are soldered on to the printed circuit board 35. The trigger capacitor 53, having been charged through the booster circuit, is discharged upon turning on of the synchro switch 32. The current from the trigger capacitor 53 being discharged flows in the primary winding of the trigger transformer 54, so as to generate trigger voltage in its secondary winding as high as 4 kV. The trigger voltage is output from the trigger output terminal 54a on the top of the trigger transformer 54.

The trigger segment 45 consists of a metal plate having conductivity. A hole 45a is formed in the trigger segment 45, and receives a pin 58 formed on the reflector case 39, so that the trigger segment 45 is secured to the flash device 23. A first end 45b of the trigger segment 45 is secured to the trigger output terminal 54a. A remaining end of the trigger segment 45 is a contact end 45c, which is inserted through a lateral end of the reflector case 39 as illustrated in FIG. 3.

Figure 5:
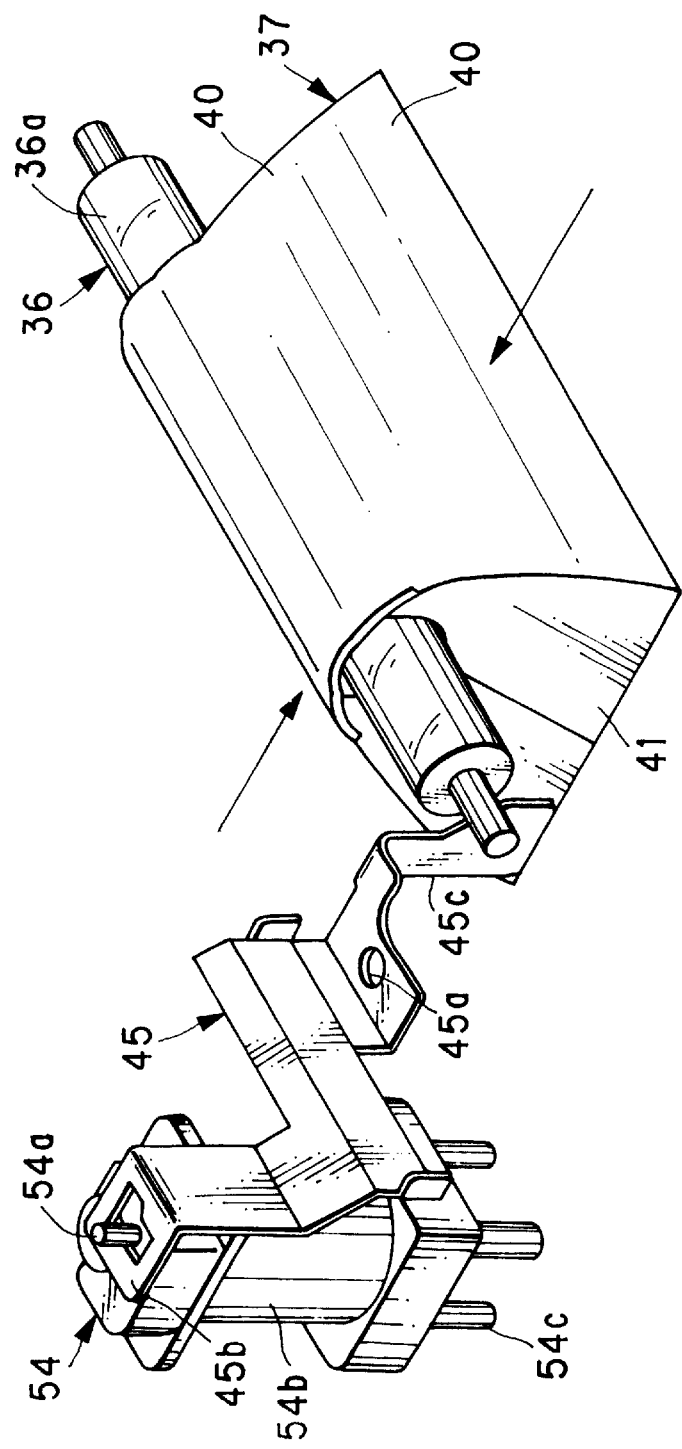
FIG. 5 is a perspective illustrating a connected state of a trigger segment and a reflector.

In FIG. 5, the connection of the trigger segment 45 between the trigger transformer 54 and the reflector 37 is illustrated. The first end 45b of the trigger segment 45 is caulked on to the trigger output terminal 54a for the electrical connection. The contact end 45c contacts the outer surface of one of the lateral portions 41 inside the reflector case 39 for the electrical connection. The contact end 45c is slightly bent toward the one of the lateral portions 41, and pushes it with predetermined pressure to ensure the connection.

It is likely that the peripheral reflective portion 40 of the reflector 37 is deformed by force in a direction indicated by arrow of FIG. 5. If the peripheral reflective portion 40 is deformed, an illuminating pattern of the flash light at a distance of several meters becomes different from an illuminating pattern initially expected for the reflector 37. In the present invention, the contact end 45c of the trigger segment 45 is kept in contact with one of the lateral portions 41, which are likely to keep its shape against the force in the longitudinal direction of the flash discharge tube 36, and which hardly influences the illuminating pattern even when deformed.

The trigger voltage output from the trigger output terminal 54a is applied to the lateral portion 41 of the reflector 37 via the trigger segment 45, and thus applied to the flash tube body 36a via the peripheral reflective portion 40. Trigger current flows to the flash discharge tube 36.

The operation of the above construction is now described. In the manufacture of the lens-fitted photo film unit 10, the main body 21 is conveyed in a line. The exposure unit 22 and the flash device 23 have been separately manufactured in their lines, and are now mounted on the main body 21. The photo film cassette 20 is also loaded into the main body 21, to which the front cover 24 and the rear cover 25 are secured to obtain the housing 11. The label 12 is wound about the housing 11 to produce the lens-fitted photo film unit 10.

In manufacturing the flash device 23, the various electrical parts with lead terminals or parts of the chip type are mounted on the printed circuit board 35, including the main capacitor 30, the oscillation transistor 50, the oscillation transformer 51, the trigger capacitor 53 and the trigger transformer 54. Those parts are soldered on to lands of the printed circuit board 35. After this the printed circuit board 35 is transferred to a station for assembly of the flash emitter 17.

For the flash emitter 17, the flash discharge tube 36, the reflector 37 and the diffuser plate 38 are mounted in the reflector case 39. The tube connector segments 46a and 46b are assembled and soldered on to the terminals 36b of the flash discharge tube 36. The flash tube body 36a is kept in contact with the peripheral reflective portion 40 in disposing the flash discharge tube 36.

After this an automatic assembly apparatus fits the hole 45a of the trigger segment 45 on the diffuser plate 38, to mount the trigger segment 45 on the reflector case 39. The contact end 45c of the trigger segment 45 is inserted into the reflector case 39 through one of its sides. The contact end 45c contacts the outer surface of the lateral portions 41. The trigger segment 45 is positioned by the pin 58. The contact end 45c bent slightly pushes the outer surface of the lateral portions 41 with the pressure. Thus the trigger segment 45 is connected to the reflector 37.

The flash emitter 17 being finally assembled is mounted on the printed circuit board 35. The rear of the printed circuit board 35 is kept directed upwards, while the engaging claw 39b and the engaging pin 39c of the reflector case 39 are fitted in holes (not shown) formed in the printed circuit board 35 to position the flash emitter 17 on the printed circuit board 35. At the same time, the trigger output terminal 54a of the trigger transformer 54 is inserted in the hole in the first end 45b of the trigger segment 45. The trigger output terminal 54a and the first end 45b are caulked together, and fixed on each other.

The flash device 23 being produced finally is transferred to a station for inspection, and is subjected to the inspection of the soldering and flash emission. If the flash device 23 is detected acceptable according to the inspection, the flash device 23 is transferred to a station of assembly to the main body 21.

In inspection of the flash emission, both adequacy of the flash light and an illuminating pattern of the flash light are checked. For the inspection, the main capacitor 30 and the trigger capacitor 53 are charged in the same manner as for flash photography. Then the synchro switch 32 is turned on to emit flash light. Upon turning on of the synchro switch 32, the trigger capacitor 53 is discharged to generate trigger voltage in the primary winding of the trigger transformer 54. The trigger voltage is output through the trigger output terminal 54a, is applied to the outer surface of the flash tube body 36a via the trigger segment 45 and the reflector 37. Trigger current flows to the flash discharge tube 36, to discharge the main capacitor 30. Flash light is emitted.

Most of the flash light emitted by the flash discharge tube 36 is reflected by the inside of the peripheral reflective portion 40. A small part of the flash light is reflected by the inside of the lateral portions 41. The flash light emerges toward the front through the diffuser plate 38.

The trigger segment 45 includes the contact end 45c having a comparatively high strength, and pushes the portion of the reflector 37 in a manner little influencing the illuminating pattern. Even if there is a change in precision in the position of assembly of the trigger segment 45 or the position of the contact of the reflector 37, very few flash devices 23 are detected unacceptable after the inspection. In other words, probability in occurrence of an unacceptable flash device is very low for the reason of unacceptable changes in the illuminating pattern.

If the automation of assembly of the flash device 23 is improved, precision of the assembly machine for the trigger segment 45 can be determined lower, and characteristics of the assembly machine can be varied in a wider range. This is because the illuminating pattern of the flash light is not influenced even if the pressure of the trigger segment 45 to the reflector 37 is changed.

Furthermore, the contact end 45c of the trigger segment 45 can push the reflector 37 with somewhat great pressure. The trigger voltage from the trigger transformer 54 can be applied to the flash discharge tube 36 reliably and stably to cause trigger current to flow, so as to stabilize the flash emission.

The lens-fitted photo film unit 10, which incorporates the flash device 23 detected as acceptable, is shipped and supplied to a user. It is likely that there occur changes in the contact position or pressure of the trigger segment 45 because of changes in the temperature, shock or vibration after the shipment. However it is possible to obtain the appropriate illuminating pattern of the flash light for the reason the same as described above. No irregularity occurs in the application of the flash light due to the contact of the trigger segment 45 with the reflector 37. Accordingly a photograph taken with this flash light can be finished with high quality without irregularity in the exposure.

Figure 6:
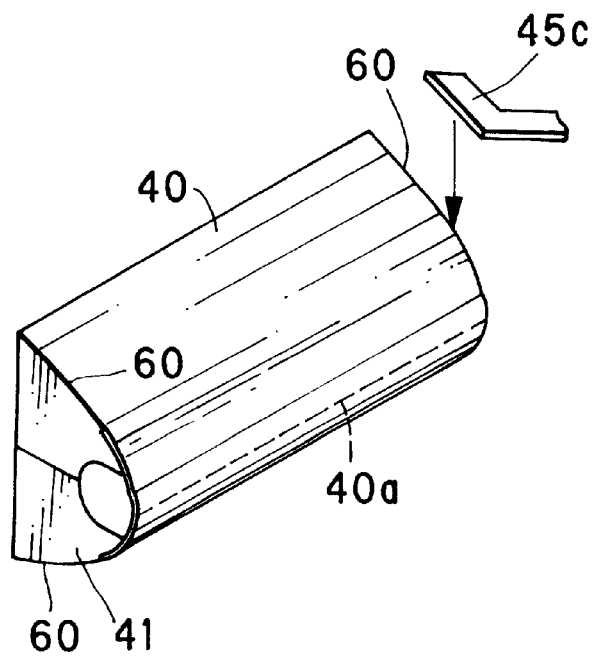
FIG. 6 is a perspective illustrating another preferred embodiment in which a trigger segment contacts a ridge side of the reflector.

In FIG. 6, another preferred embodiment is depicted, in which the contact end 45c of the trigger segment 45 is kept in contact with a ridge side 60 of the reflector 37 located as a border between the peripheral reflective portion 40 and the lateral portions 41. The ridge side 60 is a bend portion of the reflector 37 and have a great strength. If the contact end 45c presses the ridge side 60, the reflector 37 is not deformed. The illuminating pattern is not influenced.

An outer surface of a portion of the peripheral reflective portion 40 contacted by the flash tube body 36a is a curved surface in an arc shape as viewed in the cross section. The rearmost part of this portion consists of a ridge side 40a which has high strength and is considerably resistant to deformation. If the contact end 45c of the trigger segment 45 is pressed against the ridge side 40a, no influence occurs to the illuminating pattern. Note that a reflector having a shape different from the above has a high strength along its ridge side. Thus the illuminating pattern can be kept acceptable if a trigger segment is located to push the ridge side.

Note that a lead line or the like may be used to connect the trigger output terminal of the trigger transformer with the trigger segment, which may be fixed on the reflector case. One end of the trigger segment may contact the reflector. However the above embodiment is still advantageous in that only the trigger segment is used to connect the trigger transformer with the reflector, because the number of the parts can be reduced, and it is suitable for automated assembly operation.

Figure 7A:
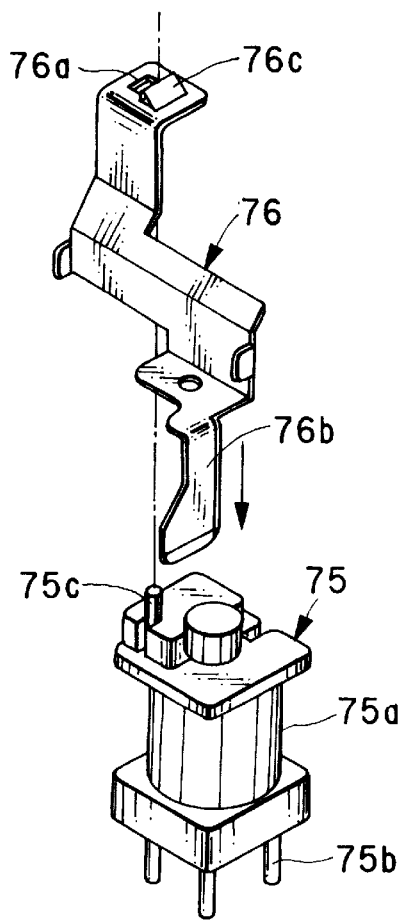
FIG. 7A is an exploded perspective illustrating still another preferred embodiment in which a bend plate ensures connection of a trigger segment with a trigger transformer.
Figure 7B:
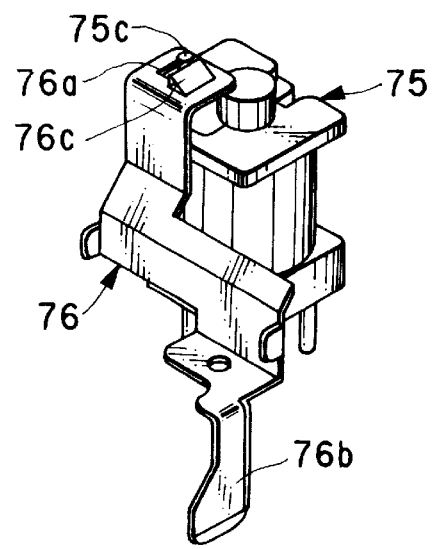
FIG. 7B is a perspective illustrating the same as FIG. 7A.
Figure 9:
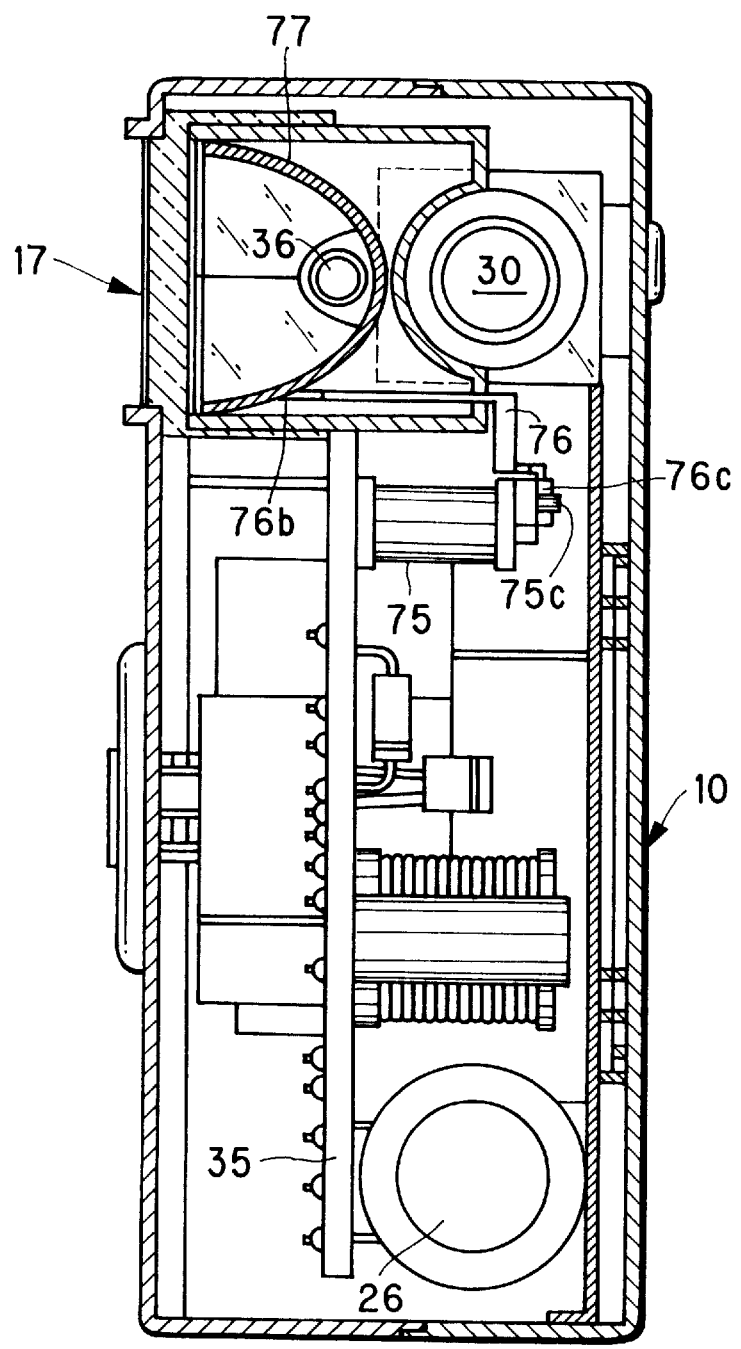
FIG. 9 is a cross section illustrating the lens-fitted photo film unit.

In FIGS. 7–9, another preferred embodiment is referred to, in which assembly operation of a trigger segment can be simplified, to reduce the time required for the assembly. A trigger transformer 75 includes a winding component 75a, lower terminals 75b and a trigger output terminal 75c. The lower terminals 75b are soldered on to the circuit pattern of the printed circuit board 35.

A trigger segment 76 is fitted on the trigger output terminal 75c. The trigger segment 76 consists of a resilient metal plate. One end of the trigger segment 76 has an engaging hole 76a. A remaining end of the trigger segment 76 constitutes a contact end 76b. The engaging hole 76a of the trigger segment 76 receives insertion of the trigger output terminal 75c of the trigger transformer 75. A bend plate 76c is formed with one side of the engaging hole 76a, and bent in a direction of insertion of the trigger output terminal 75c. The bend plate 76c resiliently pushes the trigger output terminal 75c to connect the trigger output terminal 75c with the trigger segment 76 electrically.

The bend plate 76c is bent in a direction of the insertion of the trigger output terminal 75c. After the insertion, the trigger segment 76 does not move away from the trigger transformer 75. The trigger segment 76 can be secured to the trigger transformer 75 reliably without soldering. In FIG. 9, the contact end 76b of the trigger segment 76 contacts a rear of a metal reflector 77 included in the flash emitter 17.

The bend plate 76c of the engaging hole 76a is caused by the resiliency to press the trigger output terminal 75c for electrical connection between the trigger output terminal 75c and the trigger segment 76. At the same time the contact end 76b contacts the rear of the reflector 77. As the bend plate 76c is bent in the insertion direction of the trigger output terminal 75c, the trigger segment 76 is kept from being separated from the trigger transformer 75.

Thus the resiliency of the trigger segment 76 keeps the trigger segment 76 secured to the trigger output terminal 75c of the trigger transformer 75. Soldering which would require much complicated operation can be eliminated. It is possible to increase the speed of the assembly and to reduce the manufacturing cost.

Note that various shapes of a bend plates may be used in manners other than the above. In FIG. 10, four bend plates 81a, 81b, 81c and 81d are shaped to surround the trigger output terminal 75c of the trigger transformer 75 in four directions, and bent in the direction of the insertion. This construction enlarges an area of contact between the trigger output terminal 75c and a trigger segment 82. The connection can be made more reliable.

Also one or more notches or cuts can be formed in a tip of the trigger output terminal for receiving a part of the bend plates, so as to ensure the fixed connection of the trigger transformer and the trigger segment.

Figure 11:
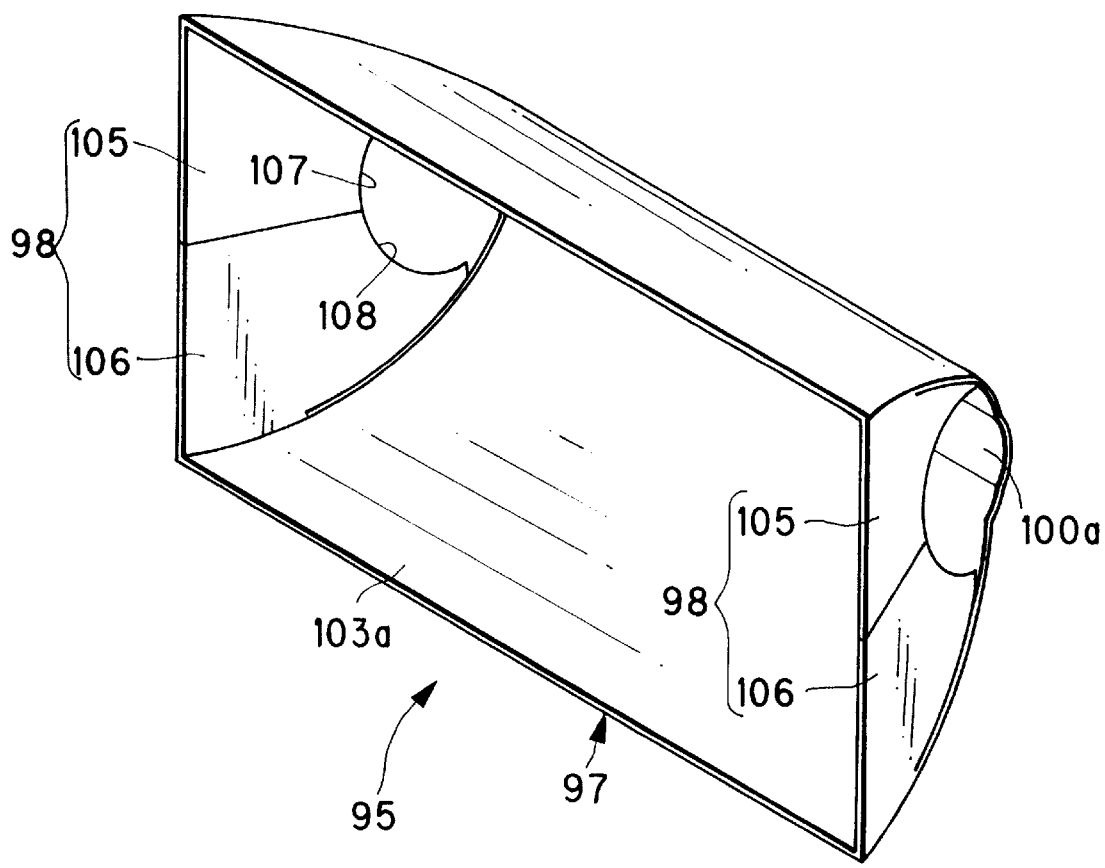
FIG. 11 is a perspective illustrating a reflector for a flash discharge tube having a higher efficiency of light condensation.

Referring now to FIGS. 11–14, a reflector 95 for the flash discharge tube is described, in which efficiency in condensing flash light is increased. In FIG. 11, the reflector 95 is formed by pressing a single thin plate of metal, and includes a peripheral reflective portion 97 and lateral portions 98 having lateral reflective surfaces. The peripheral reflective portion 97 covers a part of a cylindrical surface of a flash discharge tube 96 of FIGS. 12 and 14. The lateral portions 98 cover portions of the flash discharge tube 96 near to its ends.

Figure 12:
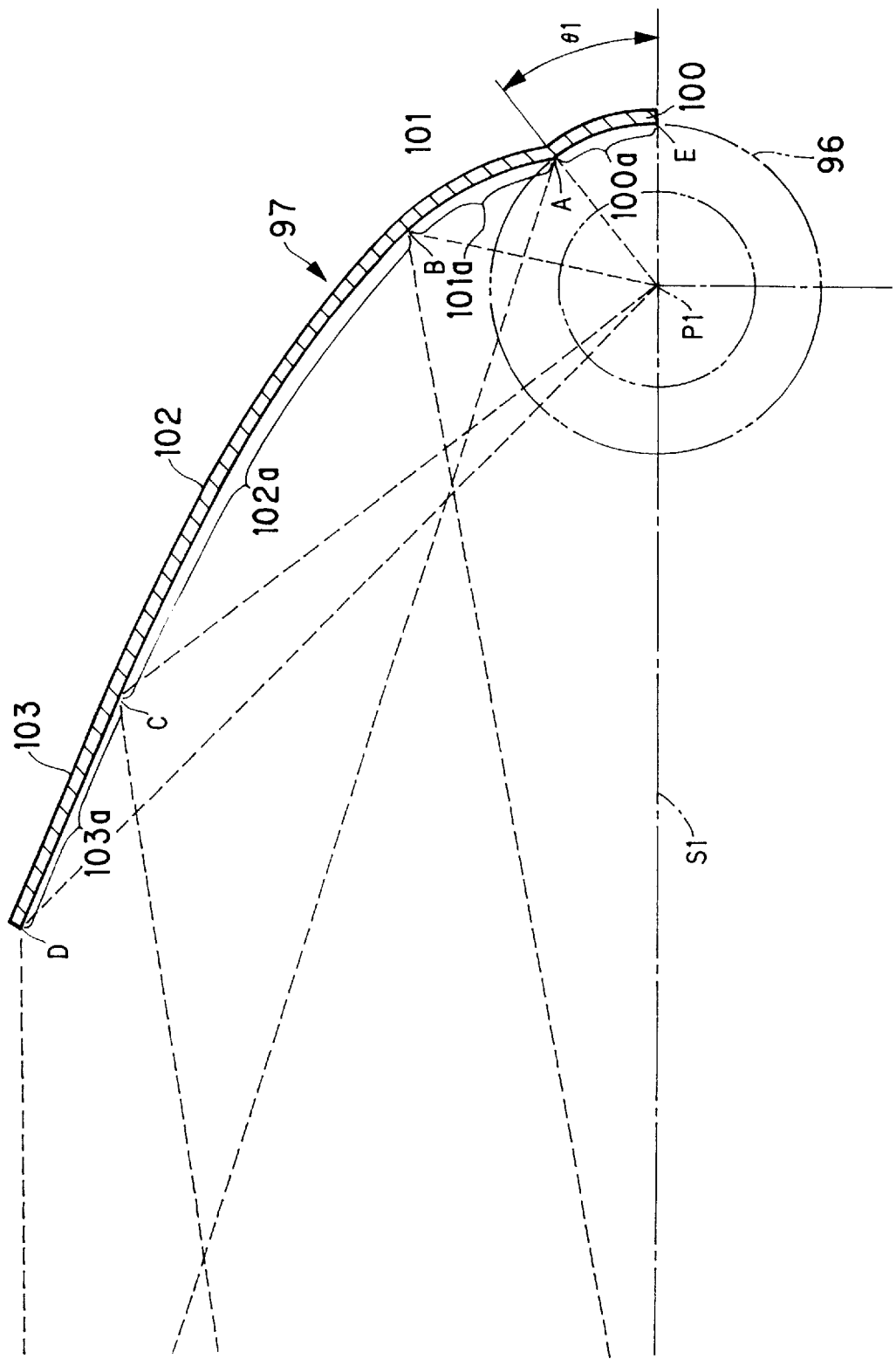
FIG. 12 is a cross section illustrating an upper half of the reflector.

FIG. 12 is a cross section in which the peripheral reflective portion 97 is illustrated in enlargement. To avoid complicated depiction, only the upper half of the peripheral reflective portion 97 is illustrated. Of course the lower half of the peripheral reflective portion 97, which is not shown, is symmetrical with the upper half with reference to a reference line S1, which is horizontal and passes the center of the flash discharge tube 96.

The peripheral reflective portion 97 consists of a combination of a tube receiver portion 100, a first curved portion 101, a second curved portion 102, and a flat portion 103 in series. The tube receiver portion 100 has a receiver surface 100a of an arc shape as viewed in cross section, and receives the flash discharge tube 96. The first curved portion 101 has a first curved reflective surface 101a which has a circular arc shape as viewed in the cross section. The second curved portion 102 has a second curved reflective surface 102a which has an elliptical arc shape as viewed in the cross section. The flat portion 103 has a flat reflective surface 103a.

The receiver surface 100a is shaped in an arc EA as viewed in cross section, and has a curvature of which a radius is 1.25 mm, which is suitable for the flash discharge tube 96 having an outer diameter of 2.5 mm. An angle θ1 of the curvature of the receiver surface 100a satisfies the condition 30°≦θ1≦60° with reference to the reference line S1. The condition of θ1≧30° makes it possible for the receiver surface 100a to transmit the trigger current reliably to the flash discharge tube 96. The condition of θ1≦60° makes it possible to reduce an amount of part of the flash light becoming incident again on the flash discharge tube 96 from the tube receiver portion 100.

The first curved reflective surface 101a is defined by an arc AB in the cross section. The arc AB has a radius of 1.6–2.4 mm, which is enough to have a space from the flash discharge tube 96 having the outer diameter of 2.5 mm. Rays are emitted from a center P1 of the flash discharge tube 96, are reflected by the first curved reflective surface 101a, and then illuminate a section A'–B' of FIG. 13 between a limit position A' of an effective illuminated region EA and a first position B' near to the bottom of a central illuminated region CA. The arc AB is predetermined in consideration of this illumination of rays. Rays reflected in the vicinity of a communicating point A of the first curved reflective surface 101a in connection with the tube receiver portion 100 are caused to illuminate the limit position A' of the effective illuminated region EA. Furthermore, rays emitted from the center P1 of the flash discharge tube 96 are reflected by a communicating point B of the first curved reflective surface 101a in connection of the arc AB and an elliptical arc BC, and then illuminates the first position B' near to the bottom of the central illuminated region CA. It is to be noted that the effective illuminated region EA is defined a frame region to be photographable with the camera. In the present embodiment, the central illuminated region CA has a vertical size L½ which is half as great as a vertical illuminated size L1 of the effective illuminated region EA. A center of the central illuminated region CA coincides with that of the effective illuminated region EA.

The second curved reflective surface 102a is shaped in the elliptical arc BC as viewed in the cross section. The elliptical arc BC communicates with the arc AB in such a manner that there is one tangent which is common between the elliptical arc BC and the arc AB and passes the communicating point A. The elliptical arc BC has a curving extent which gradually increases in a direction toward the arc AB. In FIG. 13, the flash light, emitted from the center of the flash discharge tube 96, is reflected by the second curved reflective surface 102a and then illuminates a section B'–C', or a section defined between the first position B' and a position C' in the vicinity of the bottom of the central illuminated region CA. To be precise, the elliptical arc BC is a portion of an ellipse of which a length of a longer axis is 41.65 mm and a length of a shorter axis is 13.18 mm. The elliptical arc BC is defined between two rotational angles of 5°39'36" and 13°8'27" as a central angle measured with reference to one end of the longer axis. Of course it is possible to use a differently defined elliptical arc, for the purpose of reflection of the flash light toward the section B'–C' which is in the vicinity of the lower end of the central illuminated region CA.

The flat reflective surface 103a is defined by a straight line CD in the cross section. The straight line CD is a tangent of the elliptical arc BC, and is connected therewith. In FIG. 13, rays emitted from the center P1 of the flash discharge tube 96 are reflected by the flat reflective surface 103a, and then illuminate a section C'–D' between a center D' of the central illuminated region CA and the position C' near to the bottom of the central illuminated region CA.

Note that only rays emitted from the center P1 of the flash discharge tube 96 are typically depicted in FIG. 13. The entirety of the rays as flash light emitted from the flash discharge tube 96 has a certain width defined to include the partial rays as depicted.

In FIG. 11, each of the lateral portions 98 is constituted by a pair of lateral plates 105 and 106 which extend from the flat portion 103. The lateral plates 105 and 106 are bent in a vertical manner to the flat portion 103. Portions of the lateral plates 105 and 106 are cut away in the vicinity of the tube receiver portion 100 and the first curved portion 101, to form cutouts 107 and 108. In FIG. 14, the cutouts 107 and 108 cause ends of the flash discharge tube 96 to appear to the outside of the reflector 95.

In FIG. 14, the lateral portions 98 have a lateral reflective surface, and are disposed with an inclination at an inclining angle θ2 with reference to a central line of the flash discharge tube 96 as viewed in a horizontal plan. The lateral portions 98 operate to increase the efficiency in illumination the effective illuminated region. Also a tube arc length L2 of the flash discharge tube 96 is determined smaller than a tube receiver length L3 for the purpose of utilizing the flash light effectively.

The operation of the present embodiment is described. In taking an exposure, the flash discharge tube 96 emits flash light in synchronism with a shutter releasing operation. The rays light from the flash discharge tube 96 directly illuminate the effective illuminated region EA. Also the rays are reflected by the reflector 95 before illuminating the effective illuminated region EA as illustrated in FIGS. 12 and 13.

The rays reflected by the first curved reflective surface 101a illuminate a section A'–B', which lies between the limit position A' at the top of the effective illuminated region EA and the first position B' at the bottom of the central illuminated region CA. The rays reflected by the flat reflective surface 103a illuminate the section C'–D', which lies between the center D' of the central illuminated region CA and the position C' at the bottom of the central illuminated region CA. Also the rays reflected by the second curved reflective surface 102a illuminate the section B'–C' in the vicinity of the bottom of the central illuminated region CA. Consequently, the combination of the first curved reflective surface 101a, the second curved reflective surface 102a and the flat reflective surface 103a illuminates a section from the limit position A' to the first position B' and the position C', and then to the center D' of the central illuminated region CA, all within the effective illuminated region EA. The distribution of the reflected flash light can be well-balanced. The central illuminated region CA can be sufficiently illuminated. As a result of an experiment, it was found that the amount of the flash light incident upon the effective illuminated region EA was increased by 16–30% over a conventional reflector simply constituted by a curved reflective surface of an arc shape or an elliptical arc shape.

In the above embodiments, an aluminum plate is pressed to form the reflector 95. However a plate of any suitable kind of metal may be used. Preferable metal can have electrical conductivity and high factor of reflectance. Also a resin material may be used and molded in the shape of the reflector. This resin plate being bent may be provided with a metal reflection layer by a technique of vapor deposition. For this resin plate, a small aluminum plate can be combined as a tube receiver portion for the purpose of application of the trigger voltage.

In the above embodiment, the second curved portion 102 defined by the elliptical arc communicates between the first curved portion 101 and the flat portion 103. However the second curved reflective surface 102a of the second curved portion 102 may be constructed by a pseudo elliptical arc as viewed in the cross section. Such a pseudo elliptical arc can be a combination of a series of plural circular arcs which have different radii of curvature, and are smoothly connected in sequence in the order of the radii. This pseudo elliptical arc should be understood in the term of "elliptical arc" used in the present specification.

In the above embodiment, the electronic flash device is constructed as a portion of the lens-fitted photo film unit. Also the flash device of the present invention may be incorporated in cameras of any types. The reflector of the above embodiment is combined with the flash discharge tube. But the reflector of the present invention may be combined with a fluorescent lamp, an ultraviolet lamp, or any light source of a straight tube shape.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A flash device, including a flash discharge tube for emitting flash light in response to occurrence of trigger current, a reflector, having electrical conductivity, for transmitting said trigger current to flash discharge tube, and for reflecting said flash light toward a photographic field in a predetermined illuminating pattern, said reflector including a peripheral reflective portion and lateral portions, said peripheral reflective portion being curved to cover a rear, a top and a bottom of said flash discharge tube, said lateral portions being disposed on ends of said peripheral reflective portion in a longitudinal direction of said flash device, and a trigger segment for transmitting said trigger current to said reflector, said flash device comprising:

said trigger segment being disposed to push an outer face of said lateral portions for electrical connection with said reflector, so as to stabilize orientation of said reflector for avoiding changes in said predetermined illuminating pattern.

2. A flash device as defined in claim 1, further comprising a trigger transformer for outputting said trigger current;

wherein said trigger segment has a first end connected with said trigger transformer, and a second end connected with said reflector.

3. A flash device, including a flash discharge tube for emitting flash light in response to occurrence of trigger current, a reflector, having electrical conductivity, for transmitting said trigger current to flash discharge tube, and having a predetermined bent shape, for reflecting said flash light toward a photographic field in a predetermined illuminating pattern, and a trigger segment for transmitting said trigger current to said reflector, said flash device comprising:

said trigger segment being disposed to push a ridge portion of an outer face of said reflector for electrical connection with said reflector, so as to stabilize orientation of said reflector for avoiding changes in said predetermined illuminating pattern.

4. A flash device as defined in claim 3, further comprising a trigger transformer for outputting said trigger current;

wherein said trigger segment has a first end connected with said trigger transformer, and a second end connected with said reflector.

5. A flash device, including a flash discharge tube, having gas enclosed therein, for emitting flash light in response to occurrence of trigger current, a trigger transformer for generating said trigger current, and a trigger segment for transmitting said trigger current to said flash discharge tube, said flash device comprising:

a bend plate, formed integrally with an end of said trigger segment, bent in a direction of insertion of a trigger output terminal of said trigger transformer, for resiliently keeping said trigger segment pushed on said trigger output terminal.

6. A reflector for a flash discharge tube, having a tube receiver portion through which trigger voltage is applied to said flash discharge tube, said reflector comprising:

a first curved reflective surface, having a shape of an arc as viewed in cross section, for extending from said tube receiver portion;

a second curved reflective surface, having a shape of an elliptical arc as viewed in cross section, for extending from said first curved reflective surface;

a flat reflective surface, having a shape of a straight line as viewed in cross section, for extending from said second curved reflective surface.

7. A reflector as defined in claim 6, wherein said first curved reflective surface comprises a pair of first curved reflective surfaces disposed in axial symmetry to each other with reference to said flash discharge tube, said second curved reflective surface comprises a pair of second curved reflective surfaces disposed in said axial symmetry to each other with reference to said flash discharge tube, and said flat reflective surface comprises a pair of flat reflective surfaces disposed in said axial symmetry to each other with reference to said flash discharge tube.

8. A reflector as defined in claim 7, wherein said tube receiver portion has a diameter equal to or more than a diameter of said flash discharge tube, an angular range of said tube receiver portion is 30–60° with reference to a reference line of said axial symmetry.

9. A reflector as defined in claim 6, wherein said straight line is a tangent of said elliptical arc;

said flat reflective surface is so formed that rays emitted by said flash discharge tube are reflected by said flat reflective surface and then illuminate a zone from a center of an effective illuminating region to a first position, and said first position is disposed within said effective illuminating region, offset from said center vertically, and located on a side opposite to said flat reflective surface with reference to said center.

10. A reflector as defined in claim 9, wherein said first position is equidistant from said center and one limit position of said effective illuminating region.

11. A reflector as defined in claim 6, wherein said first curved reflective surface is so formed that rays emitted by said flash discharge tube are reflected by a communicating point between said first and second curved reflective surfaces and then illuminate a first position, and said first position is disposed within an effective illuminating region, offset from a center of said effective illuminating region vertically, and located on a side opposite to said first curved reflective surface with reference to said center; and said first curved reflective surface is so formed that rays emitted by said flash discharge tube are reflected by a communicating point between said first curved reflective surface and said tube receiver portion and then illuminate substantially a first limit position of said effective illuminating region, and said first limit position is located on a side of said first curved reflective surface with reference to said center.

12. A reflector as defined in claim 11, wherein said first position is equidistant from said center and one limit position of said effective illuminating region.

13. A reflector as defined in claim 6, wherein said second curved reflective surface is so formed that rays emitted by said flash discharge tube are reflected by said second curved reflective surface and then illuminate a first position, and said first position is disposed within an effective illuminating region, offset from a center of said effective illuminating region vertically, and located on a side opposite to said second curved reflective surface with reference to said center; and said arc and said elliptical arc have one common tangent passing a communicating point between said arc and said elliptical arc.

14. A reflector as defined in claim 13, wherein said first position is equidistant from said center and one limit position of said effective illuminating region.

15. A reflector as defined in claim 6, wherein said tube receiver portion has a length greater than a length of said flash discharge tube.

16. A reflector as defined in claim 6, further comprising a pair of lateral reflective surfaces, respectively disposed on an end of said first and second reflective surfaces and said flat reflective surface, for spreading with an inclination at an angle of 60–70° with reference to said flash discharge tube in a direction away from said flash discharge tube.

17. A flash device, including a flash discharge tube for emitting flash light, and a reflector for reflecting said flash light toward a photographic field, said flash device comprising:

a tube receiver portion, disposed in said reflector, for receiving said flash discharge tube fitted thereon;

a first curved reflective surface, formed on said reflector to extend from said tube receiver portion, and having a shape of an arc as viewed in cross section;

a second curved reflective surface, formed on said reflector to extend from said first curved reflective surface, and having a shape of an elliptical arc as viewed in cross section;

a flat reflective surface, formed or said reflector to extend from said second curved reflective surface, and having a shape of a straight line as viewed in cross section.

* * * * *